March 14, 1939.   L. E. MUEHLER   2,150,695
ANTIHALATION LAYER FOR PHOTOGRAPHIC FILMS
Filed Oct. 25, 1934
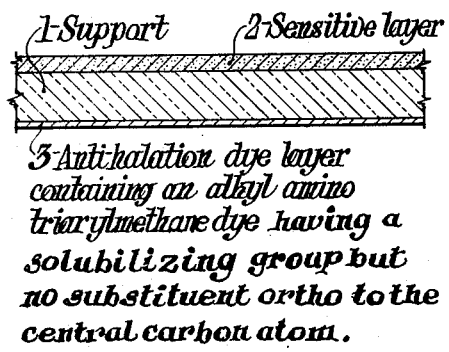
1-Support   2-Sensitive layer
3-Antihalation dye layer containing an alkyl amino triarylmethane dye having a solubilizing group but no substituent ortho to the central carbon atom.
Inventor:
Lowell E. Muehler,
N. M. Perrins
By R. F. Smith
Attorneys Patented Mar. 14, 1939

2,150,695

UNITED STATES PATENT OFFICE 2,150,695

ANTIHALATION LAYER FOR PHOTOGRAPHIC FILMS

Lowell E. Muehler, Rochester, N. Y., assignor, by mesne assignments, to Eastman Kodak Company, Jersey City, N. J., a corporation of New Jersey Application October 25, 1934, Serial No. 749,892

14 Claims. (Cl. 95—8)

This invention relates to photographic materials and particularly to dyes for anti-halation backings or layers used to obtain screening effects with sensitive photographic emulsions.

The object of this invention is to provide dyes which are specifically suitable for use in colloid anti-halation backings, anti-halation underlayers or screening layers so that the colors of the dyes do not appear in the developed, fixed and washed films or plates. By "specifically suitable" is meant those dyes which have the property of becoming and remaining colorless and remaining soluble and capable of diffusing away from a gelatine layer during the usual photographic operations of development, fixing and washing.

In the single figure of the accompanying drawing is a section on an enlarged scale of a film or plate embodying an example of my invention. As there illustrated, it comprises a support 1 of transparent material such as glass, cellulosic material as cellulose nitrate or acetate, or other transparent material, a light-sensitive material 2 on one face of the support, and on the other face of the support a layer 3 formed by coating with a solution of an alkyl amino triarylmethane dye or mixture of dyes forming the principal feature of my invention.

Dyes suitable for this purpose are alkylated di and tri amino derivatives of triarylmethane which contain suitable solubilizing groups such as sulphonic acid, —$SO_2(OH)$, or a quaternary ammonium group containing three alkyl radicals, besides the single halogen atom characteristic of a quaternary ammonium compound, e. g. —$N(CH_3)_2.CH_3Cl$ in such a position in the molecule that the dyes in gelatine (for example) are decolorized, remain soluble and readily diffuse away from the gelatine when treated with solutions containing alkali, alkali sulphite or alkali bisulphite. Other groups may also be used instead of the sulphonic acid as hereinafter described.

It is generally known that many of the triarylmethane dyes bleach out in solutions of sulphurous acid or sulphurous acid salts; however, in connection with the preparation of anti-halation backings and layers. only certain of the dyes are useful and remain decolorized in processing and washing. With many of the basic dyes which are not useful, the color of the dye layer disappears in the developer but returns in the fixing bath or upon washing. Water soluble benzylated and arylated amino triarylmethane dyes are also not suitable since, in spite of the fact that many of them decolorize in the processing solutions. the decolorized compounds remain in the gelatine and are therefore susceptible to later return of the dye color. The failure of these classes of dyes to be removed after decolorization is apparently due either to the insolubility of the compounds produced or to the propensity of the dye compounds to attach themselves (mordant) to gelatine.

With the triarylmethane dyes, in order to obtain decolorizing of the dye and at the same time arrive at a finished film free from decolorized dye compounds, three requirements appear to be essential:

(1) Alkali, alkali sulphite, or alkali bisulphite must decolorize the dye to give a colorless carbinol or a colorless addition compound with sulphite.

(2) The colorless carbinol or the colorless addition compound with sulphite should be soluble.

(3) The colorless dye compounds should not attach themselves (mordant) to the gelatine during processing or washing.

Included in the group of alkylated amino triarylmethane dyes which conform to the foregoing requirements are certain alkylated triamino and alkylated diamino derivatives. The term alkylated amino throughout this specification is taken to mean amino groups having either one or two hydrogen atoms replaced.

The dyes may contain one or more alkylated amino groups, depending upon the color and properties desired. As a first structural requirement for all of the dyes (both tri- and di-amino derivatives) included in this specification the positions in the aryl groups ortho to the arylmethane carbon atom must remain unsubstituted. This is essential in order that the dyes be decolorized with alkali, alkali sulphite, or alkali bisulphite.

Of the alkylated triamino derivatives the following are suitable for use in anti-halation layers:

(a) Dyes in which one completely alkylated amino group has been treated so that a quaternary ammonium group is obtained such as Methyl Green, Schultz Farbstofftabellen, 7th edition, No. 788, Color Index, No. 684; the similar dyes Ethyl Green, Schultz, No. 789, Color Index, No. 685, and Iodine Green, Schultz, No. 790, Color Index, No. 686. The dye Methyl Green is known as hexamethyl 4-4' diamino-fuchsonimonium chloride chlormethylate.

(b) Dyes which contain acid groups such as sulphonic acid as substitutents in one or more of the three aryl nuclei in positions other than those ortho to the arylmethane carbon atom, for example: Red Violet 5RS Schultz, No. 801, Color Index, No. 693, and Acid Violet 4RS, Schultz, No. 802, Color Index, No. 694. The leuco form of the dye Red Violet 5RS is 4-4" diamino 4' ethyl amino 3' methyl triphenyl-methane di- or tri-sulphonic acid, while that of the dye Acid Violet 4RS is 4-4' dimethyl-diamino 3' methyl 4" amino triphenylmethane di- or tri-sulphonic acid.

(c) Dyes which contain acid groups such as sulphonic acid as substituents in the amino alkyl groups such as bis (4 methyl β sulpho ethylamino phenyl) 4'' dimethylamino phenylmethane.

In addition to the dyes given under (b) and (c) similar dyes may be used which in the aryl nuclei or in the amino alkyl groups in place of sulphonic acid contain other negative or acid groups capable of forming alkali salts, for example: Selenonic acid —SeO_2(OH), arsinic acid —AsO(OH)_2, phosphonic acid —PO(OH)_2 and boric acid —B(OH)_2. Dyes of the so-called "sulphato" type may also be used. In this case, for example, an acid group is formed by the esterification with sulphuric acid of the alcohol hydroxyl of β hydroxyethyl groups substituted in one or more of the amino groups. This process is termed sulphation by Green and Saunders, J. Soc. Dyers and Colorists, Vol. 39, 1923, pages 39–42.

With the alkylated diamino triarylmethane dyes the same structural requirements as are given for the triamino compounds in (a), (b), and (c), above, are necessary that the dyes be suitable. An example of an alkylated diamino dye with the sulphonic acid group in one of the three aryl nuclei is Helvetia Green. Schultz, Farbstofftabellen, 7th edition, No. 759, Color Index No. 660. The dyes Methyl Green, Ethyl Green, and Iodine Green, referred to above, are similar in color to the tetramethyl diamino triarylmethane dye, Helvetia Green. Consequently, they may be looked upon as derivatives of tetramethyl diamino triarylmethane, containing a quaternary nitrogen group in the para position of the third aryl radical. The presence of the quaternary ammonium group is especially valuable in conferring water solubility on the carbinol form of the dye and upon the colorless addition compounds with alkali sulphite or bisulphite.

Other diamino derivatives which may be used are those formed from the following leuco compounds:

4-4' tetramethyldiamino triphenylmethane 3'' sulphonic acid.

4-4' tetramethyldiamino triphenylmethane 3'', 5'' disulphonic acid.

4-4' tetramethyl 4'' methyl triphenylmethane 3'' sulphonic acid.

4-4' tetramethyldiamino 4'' hydroxy triphenylmethane 3'' sulphonic acid.

4-4' tetramethyldiamino 4'' methoxy triphenylmethane 3'' sulphonic acid.

4-4' tetramethyldiamino 4'' chloro triphenylmethane 3'' sulphonic acid.

Bis (4 methyl β sulfo ethyl amino phenyl) phenylmethane.

Bis (4 methyl, ethyl "sulphato" amino phenyl) phenylmethane.

As with the substituted triamino derivatives the negative or acid group, for example, sulphonic acid, must not appear in the position ortho to the triarylmethane carbon atom, nor must other nuclear substituents appear in such ortho position.

The compounds forming the subject of this invention may be prepared by methods known to the art. They may be considered as derivatives of the corresponding alkyl amino triarylmethane basic dyes in which the substitution or addition of suitable groups has increased the water solubility of (1) The colorless carbinol bases, which are formed by treatment with alkali, and, (2) The colorless addition compounds with sulphurous acid salts, such as sodium bisulphite or sodium sulphite.

In processing the films or plates which have attached layers containing these dye compounds, the films or plates are immersed in the developing solution which contains sodium sulphite or alkali and sodium sulphite. In this solution the dye is converted into a colorless carbinol form. The films or plates are subsequently treated in a fixing bath containing sulphurous acid salts, and at this point, as well as in the later washing treatment, it is necessary that the dye compounds should remain colorless and soluble.

Dyes heretofore used, while becoming soluble in the alkaline developing baths, have had the disadvantage of reverting to a colored form in the fixing baths or during washing and it is this undesirable property which this invention is designed to overcome.

Suitable dyes as included in this specification may be used in water solution with a colloid such as gelatine, or with water or alkali soluble cellulose compounds, and coated either on transparent film base or glass, or an already coated emulsion. No exact statement of the amount of dye to be used can be given since this depends upon the thickness of the coating, the nature of the photographic material, and the type of use of the screening layer on the photographic material. However, in general, when used as an anti-halation backing, a quantity of dye should be used which gives a photographic transmission density of at least 0.3 over the part of the spectrum to which the emulsion is sensitive. An excessive quantity of the dye should be avoided since protection against halation at a given wavelength is usually obtained with a backing having a transmission density of 0.6 when measured photographically.

In addition to the property of these dyes of bleaching out and remaining colorless during subsequent treatment of the films or plates, they have the additional advantage of not mordanting to the gelatine. Dyes heretofore used which bleach to a colorless form and remain colorless during processing were found to attach themselves to the gelatine in such a way that they could not be subsequently washed out.

It has also been found that the acid dyes herein described stain the film base to a much lower degree than the corresponding basic dyes so that an intermediate gelatine layer between the dye layer and the film base need not be used. With certain of these dyes the desensitizing action on an emulsion is also much reduced so that a definite improvement in product results from their use in anti-halation backings.

It is to be understood that the modifications to which I refer in the specification are by way of example only and are not to be considered as limitations, since my invention may take other forms not herein specifically mentioned.

What I claim is:

1. A light-transmitting photographic element provided with an anti-halation layer comprising a dye of the alkyl amino triarylmethane series, said aryl being of the benzene series, and said dye containing no substituent group in a position ortho to the triarylmethane carbon, and containing at least one substituent group which confers high water solubility on the dye compounds resulting from treatment in alkaline solution and sulfite solution said substituent group being selected from the group consisting of quaternary ammonium containing three alkyl radicals and a single halogen atom, sulphonic acid, selenonic acid, arsinic acid, phosphonic acid and boric acid.

2. A light-transmitting photographic element provided with an anti-halation layer comprising a dye of the alkyl amino triarylmethane series, said aryl being of the benzene series, and said dye containing no substituent group in a position ortho to the triarylmethane carbon, and containing at least one sulphonic acid group which confers high water solubility on the dye compounds resulting from treatment in alkaline solution and sulfite solution.

3. A light-transmitting photographic element provided with an anti-halation layer comprising a dye having in the leuco form the formula of a 4-4' tetramethyl diamino triphenylmethane 3'' sulphonic acid, the position ortho with respect to the triaryl methane carbon atom being unsubstituted.

4. A light-transmitting photographic element provided with an anti-halation layer comprising a dye having in the leuco form the formula 4-4' tetramethyl diamino 4'' methoxy triphenylmethane 3'' sulphonic acid, the position ortho with respect to the triaryl methane carbon atom being unsubstituted.

5. A light-transmitting photographic element provided with an anti-halation layer comprising a dye having in the leuco form the formula bis [4 methyl β sulfo ethyl amino phenyl] phenylmethane, the position ortho with respect to the triaryl methane carbon atom being unsubstituted.

6. A non-halation photographic element comprising a light-transmitting support having on one face thereof a photographically sensitive layer, and on the other face a dye of the alkyl amino triarylmethane series, said aryl being of the benzene series, and said dye containing no substituent group in a position ortho to the triarylmethane carbon, and containing at least one substituent group which confers high water solubility on the dye compounds resulting from treatment in alkaline solution and sulfite solution said substituent group being selected from the group consisting of quaternary ammonium containing three alkyl radicals and a single halogen atom, sulphonic acid, selenonic acid, arsinic acid, phosphonic acid and boric acid.

7. A non-halation photographic element comprising a light-transmitting support having on one face thereof a photographically sensitive layer, and on the other face a dye of the alkyl amino triarylmethane series, said aryl being of the benzene series, and said dye containing no substituent group in a position ortho to the triarylmethane carbon, and containing at least one sulphonic acid group which confers high water solubility on the dye compounds resulting from treatment in alkaline solution and sulfite solution.

8. A light-transmitting photographic element provided with an anti-halation layer comprising a dye of the alkyl amino triarylmethane series, said aryl being of the benzene series, and said dye containing no substituents in the aryl groups in a position ortho to the triarylmethane carbon atom and at least one substituent group which confers high water solubility on the colorless dye compounds formed by treatment with solutions containing alkali and solutions containing sulfite said substituent group being selected from the group consisting of quaternary ammonium containing three alkyl radicals and a single halogen atom, sulphonic acid, selenonic acid, arsinic acid, phosphonic acid and boric acid.

9. A non-halation photographic element comprising a light-transmitting support having on one face thereof a photographically sensitive layer, and on the other face a colloid layer containing a dye of the alkyl amino triarylmethane series, said aryl being of the benzene series, and said dye containing no substituent group in a position ortho to the triarylmethane carbon, and containing at least one substituent group which confers high water solubility on the dye compounds resulting from treatment in alkaline solution and sulfite solution said substituent group being selected from the group consisting of quaternary ammonium containing three alkyl radicals and a single halogen atom, sulphonic acid, selenonic acid, arsinic acid, phosphonic acid and boric acid.

10. A light-transmitting photographic element provided with an anti-halation layer comprising a dye of the alkyl amino triarylmethane series, said aryl being of the benzene series, and said dye containing no substituent group in a position ortho to the triarylmethane carbon, and containing at least one sulphonic acid group which confers high water solubility on the dye compounds resulting from treatment in alkaline solution and sulfite solution.

11. A light transmitting photographic element provided with an antihalation layer comprising a dye of the alkylamino triarylmethane series, said aryl being of the benzene series, and said dye having no substituent group in a position ortho with respect to the triaryl methane carbon atom, and having a quaternary ammonium group in the 4'' position, said quaternary ammonium group containing three monovalent alkyl radicals, besides the single halogen atom characteristic of a quaternary ammonium compound.

12. A light-transmitting photographic element provided with an anti-halation layer comprising a dye of the alkyl amino triaryl methane series, said aryl being of the benzene series, and said dye containing no substituent group in a position ortho to the triaryl methane carbon atom, and containing at least one quaternary ammonium group containing three alkyl radicals and a halogen atom, which confers high water-solubility on the dye compounds resulting from treatment in alkaline solution and sulfite solution.

13. A light-transmitting photographic element provided with an anti-halation layer comprising a dye of the alkyl amino triaryl methane series, said aryl being of the benzene series, and said dye being unsubstituted in a position ortho with respect to the triaryl methane carbon atom, and having a quaternary ammonium group in the 4'' position, said quaternary ammonium group containing three alkyl radicals, besides the single halogen atom characteristic of a quaternary ammonium compound.

14. A non-halation photographic element comprising a light-transmitting support having on one face thereof a photographically sensitive layer, and on the other face a dye of the alkyl amino triaryl methane series, said aryl being of the benzene series, and said dye containing no substituent group in a position ortho to the triaryl methane carbon atom, and containing at least one quaternary ammonium group containing three alkyl radicals and a halogen atom, which confers high water-solubility on the dye compounds resulting from treatment in alkaline solution and sulfite solution.

LOWELL E. MUEHLER.